United States Patent
Yoshida et al.

(10) Patent No.: US 10,189,410 B2
(45) Date of Patent: Jan. 29, 2019

(54) VEHICULAR VISUAL RECOGNITION DEVICE

(71) Applicant: KABUSHIKI KAISHA TOKAI-RIKA-DENKI-SEISAKUSHO, Aichi (JP)

(72) Inventors: Shigeki Yoshida, Aichi (JP); Hiroyuki Toyama, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 25 days.

(21) Appl. No.: 15/517,655

(22) PCT Filed: Aug. 7, 2015

(86) PCT No.: PCT/JP2015/072568
§ 371 (c)(1),
(2) Date: Apr. 7, 2017

(87) PCT Pub. No.: WO2016/059859
PCT Pub. Date: Apr. 21, 2016

(65) Prior Publication Data
US 2017/0297492 A1    Oct. 19, 2017

(30) Foreign Application Priority Data
Oct. 14, 2014 (JP) .................................. 2014-210114

(51) Int. Cl.
*B60R 1/076* (2006.01)

(52) U.S. Cl.
CPC .................................. *B60R 1/076* (2013.01)

(58) Field of Classification Search
CPC .. B60R 1/076; B60R 1/06; G02B 5/08; G02B 7/182
(Continued)

(56) References Cited

U.S. PATENT DOCUMENTS

| 2008/0245609 A1* | 10/2008 | Charlier ................. B60R 13/08 181/296 |
| 2009/0097674 A1* | 4/2009 | Watson ..................... B60R 1/12 381/86 |
| 2009/0212475 A1* | 8/2009 | Tropf ...................... F16F 15/02 267/75 |

FOREIGN PATENT DOCUMENTS

| JP | H02-142349 U | 12/1990 |
| JP | H08-334528 A | 12/1996 |

(Continued)

OTHER PUBLICATIONS

Office Action issued in a corresponding Japanese Application No. 2014-210114 dated Feb. 20, 2018.
(Continued)

*Primary Examiner* — Frank G Font
(74) *Attorney, Agent, or Firm* — Roberts Mlotkowski Safran Cole & Calderon, P.C.

(57) ABSTRACT

In a stowing mechanism of a vehicular door mirror device, sound is produced when a gear plate is rotated from a state in which a clutch plate has been disengaged from the gear plate and the clutch plate engages with the gear plate under biasing force from a coil spring. Butyl tape spans between a portion of the coil spring on an upper side of a gap and a portion of the coil spring on a lower side of the gap such that vibration of the coil spring is suppressed. Accordingly, the sound is able to be damped.

7 Claims, 11 Drawing Sheets

(58) Field of Classification Search
USPC .................................. 359/841–844, 871, 872
See application file for complete search history.

(56) References Cited

FOREIGN PATENT DOCUMENTS

| | | |
|---|---|---|
| JP | 2000-085470 A | 3/2000 |
| JP | 2006-527340 A | 11/2006 |
| JP | 2007-263282 A | 10/2007 |

OTHER PUBLICATIONS

International Search Report issued in a corresponding application PCT/JP2015/072568 dated Sep. 15, 2015.

* cited by examiner

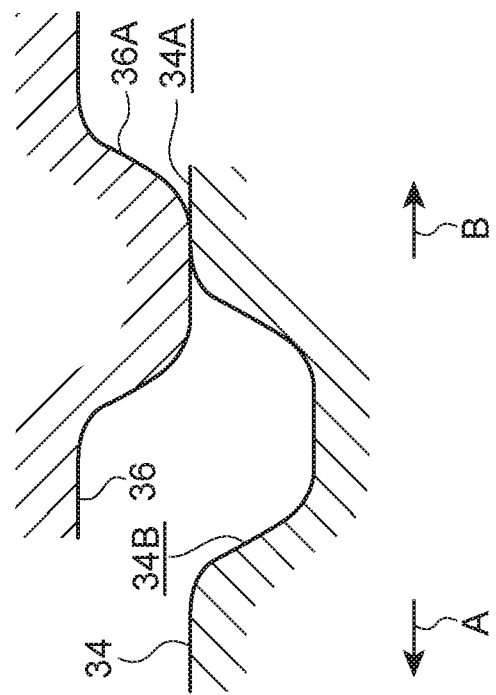
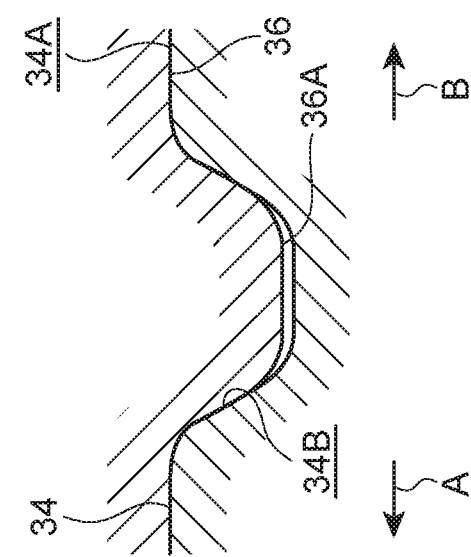

FIG.8

|  | SOUND PRESSURE(dBA) | | | | | TIME FOR 90% DAMPING (s) |
| --- | --- | --- | --- | --- | --- | --- |
|  | r1 | r2 | r3 | Ave. | 3σ |  |
| NON-COUNTERMEASURED COMPONENT | 92.2 | 92.3 | 91.8 | 92.1 | 0.7 | 42.5 |
| COUNTERMEASURED COMPONENT | 74.5 | 74.6 | 74.7 | 74.6 | 0.4 | 16.3 |

※AS NO SIGNIFICANT DEVIATION WAS OBSERVED IN REPEAT MEASUREMENTS,
THE TIME FOR 90% DAMPING IS FOR r1 ONLY

FIG.11
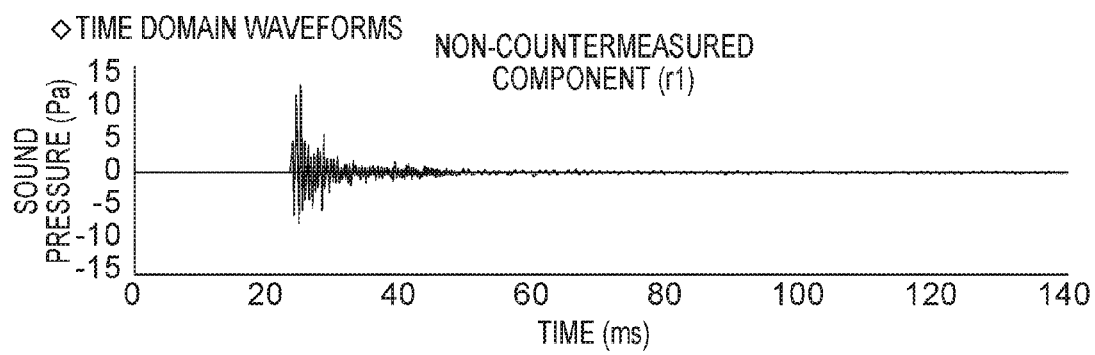
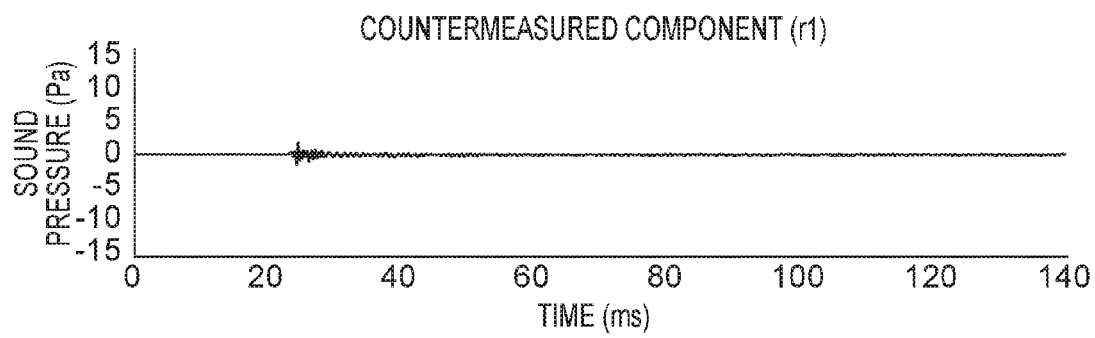
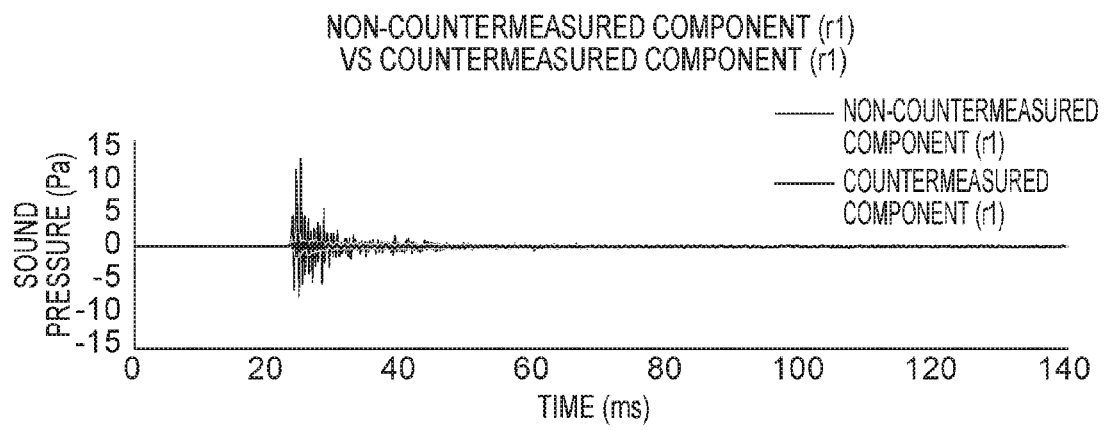

VEHICULAR VISUAL RECOGNITION DEVICE

CROSS-REFERENCE TO RELATED APPLICATIONS

The present application is a U.S. National Phase of PCT/JP2015/072568 filed on Aug. 7, 2015 claiming priority to Japanese Patent application No. 2014-210114 filed Oct. 14, 2014. The disclosure of the PCT Application is hereby incorporated by reference into the present Application.

TECHNICAL FIELD

The present invention relates to a vehicular visual recognition device in which a visual recognition means assists the visual recognition of a vehicle occupant.

BACKGROUND ART

In the automobile door mirror device described in Japanese Patent Application Laid-Open (JP-A) No. 2000-85470, biasing force from a coil spring causes a clutch (clutch groove) on a base plate side to engage with a main gear (clutch claw) on a mirror side such that swinging of the mirror is restricted. Disengaging the clutch (clutch groove) from the main gear (clutch claw) against the biasing force of the coil spring permits swinging of the mirror.

In this automobile door mirror device, sound is produced when biasing force from the coil spring causes the clutch (clutch groove) to engage with the main gear (clutch claw) from a state in which the clutch (clutch groove) has been disengaged from the main gear (clutch claw).

SUMMARY OF INVENTION

Technical Problem

In consideration of the above circumstances, an object of the present invention is to obtain a vehicular visual recognition device capable of damping sound produced when a biasing means uses biasing force to cause an engagement portion to engage with a swinging portion.

Solution to Problem

A vehicular visual recognition device of a first aspect of the present invention includes: a support body that is provided on a vehicle body side; a visual recognition means that is supported by the support body so as to be configured to swing, and that assists visual recognition by a vehicle occupant; an engagement portion that is provided on a support body side; a swinging portion that is provided on a visual recognition means side; a biasing means that is provided with a gap, that uses biasing force to cause the engagement portion to engage with the swinging portion to restrict swinging of the visual recognition means, and that permits the visual recognition means to be swung and stowed by disengaging the engagement portion from the swinging portion against the biasing force; and a damping member that is provided between a portion of the biasing means on one side of the gap and a portion of the biasing means on another side of the gap, and that dampens sound produced when the biasing means uses the biasing force to cause the swinging portion to engage with the engagement portion.

A vehicular visual recognition device of a second aspect of the present invention is the vehicular visual recognition device of the first aspect of the present invention, wherein the damping member enters into the gap.

A vehicular visual recognition device of a third aspect of the present invention is the vehicular visual recognition device of the first aspect or the second aspect of the present invention, wherein the damping member is provided at the gap along an entirety of a biasing direction of the biasing means.

A vehicular visual recognition device of a fourth aspect of the present invention is the vehicular visual recognition device of any one of the first aspect to the third aspect of the present invention, wherein the damping member is provided at an entirety of the gap.

A vehicular visual recognition device of a fifth aspect of the present invention is the vehicular visual recognition device of any one of the first aspect to the fourth aspect of the present invention, wherein the damping member is provided at the biasing means along a direction intersecting the biasing direction of the biasing means.

Advantageous Effects of Invention

In the vehicular visual recognition device of the first aspect of the present invention, the support body is provided on the vehicle body side. The visual recognition means is supported by the support body so as to be configured to swing, and the visual recognition means assists visual recognition by the vehicle occupant. Further, the engagement portion is provided on the support body side, and the swinging portion is provided on the visual recognition means side. The biasing means uses biasing force to cause the engagement portion to engage with the swinging portion to restrict swinging of the visual recognition means. Additionally, disengaging the engagement portion from the swinging portion against the biasing force of the biasing means permits the visual recognition means to be swung and stowed.

However, sound is produced when the biasing means uses biasing force to cause the engagement portion to engage with the swinging portion.

To address this, the gap is provided at the biasing means, and the damping member is provided between the portion of the biasing means on one side of the gap and the portion of the biasing means on another side of the gap such that sound is damped. This enables sound to be damped.

In the vehicular visual recognition device of the second aspect of the present invention, the damping member enters into the gap of the biasing means. This enables sound to be effectively damped.

In the vehicular visual recognition device of the third aspect of the present invention, the damping member is provided at the gap along the entirety of the biasing direction of the biasing means. This enables sound to be effectively damped.

In the vehicular visual recognition device of the fourth aspect of the present invention, the damping member is provided at the entirety of the gap of the biasing member. This enables sound to be effectively damped.

In the vehicular visual recognition device of the fifth aspect of the present invention, the damping member is provided at the biasing means along a direction intersecting the biasing direction of the biasing means. This enables the damping member to be easily provided between the portion of the biasing means on the one side of the gap and the portion of the gear mechanism on the other side of the gap.

BRIEF DESCRIPTION OF DRAWINGS

FIG. 6A is a cross-section (taken along like 6-6 in FIG. 5) illustrating an engaged state between the gear plate and the clutch plate of the stowing mechanism in the vehicular door mirror device according to the exemplary embodiment of the present invention.

FIG. 6B is a cross-section illustrating a disengaged state between the gear plate and the clutch plate of the stowing mechanism in the vehicular door mirror device according to the exemplary embodiment of the present invention.

FIG. 8 is a table illustrating measurement results of a Test Example.

FIG. 11 is a graph illustrating measurement results with regards to time domain waveforms of produced sound in the Test Example.

DESCRIPTION OF EMBODIMENTS

Figure 1:
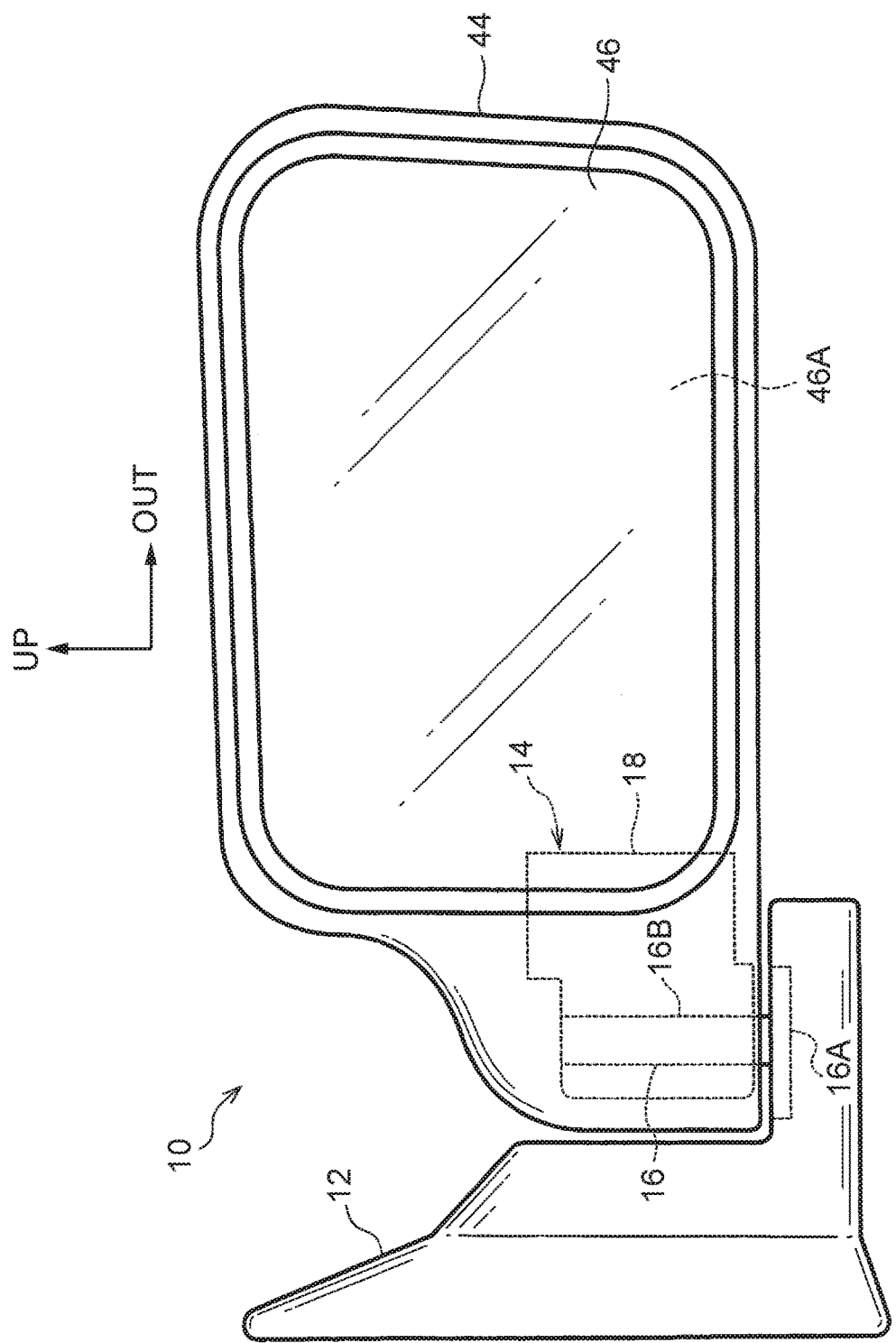
FIG. 1 is a face-on view illustrating a vehicular door mirror device according to an exemplary embodiment of the present invention, as viewed from a vehicle rear.

FIG. 1 is a face-on view illustrating a vehicular door mirror device 10 serving as a vehicular visual recognition device according to an exemplary embodiment of the present invention, as viewed from a vehicle rear. Note that in the drawings, the arrow FR indicates a vehicle front, the arrow OUT indicates a vehicle width direction outside (a vehicle right side), and the arrow UP indicates an upper side.

The vehicular door mirror device 10 according to the present exemplary embodiment is provided at an up-down direction intermediate portion of, and a vehicle front side end of, a side door serving as a vehicle door (in particular a front side door), and is disposed on the outside of the vehicle.

As illustrated in FIG. 1, the vehicular door mirror device 10 includes a stay 12 serving as an installation member. The vehicular door mirror device 10 is installed to the side door by fixing a vehicle width direction inside end portion of the stay 12 to the side door (the vehicle body side).

A stowing mechanism 14 (electric stowing mechanism, retractor) serving as a swing mechanism is supported at an upper side of a vehicle width direction outside portion of the stay 12.

Figure 2:
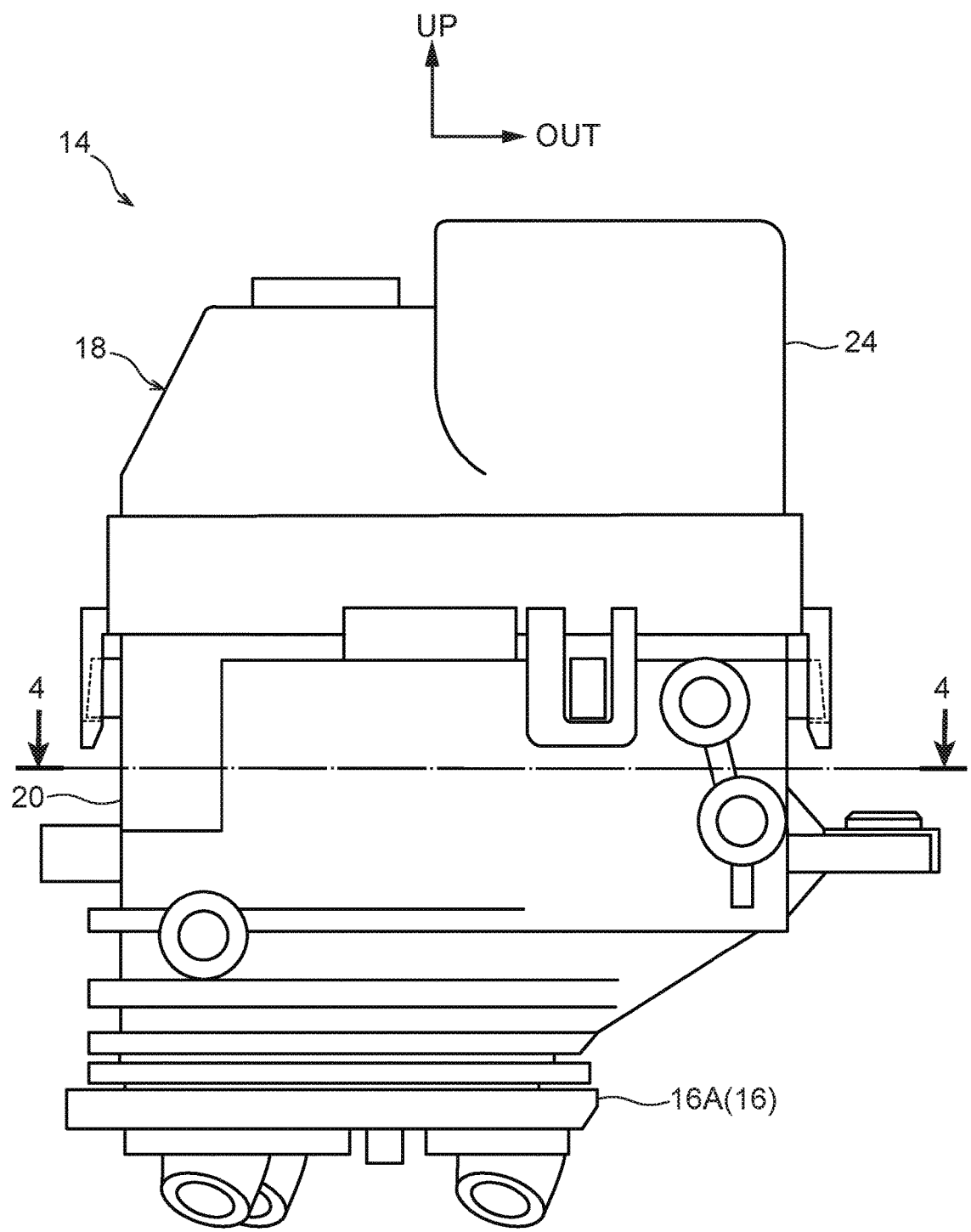
FIG. 2 is a face-on view illustrating a stowing mechanism in the vehicular door mirror device according to the exemplary embodiment of the present invention, as viewed from a vehicle rear.
Figure 3:
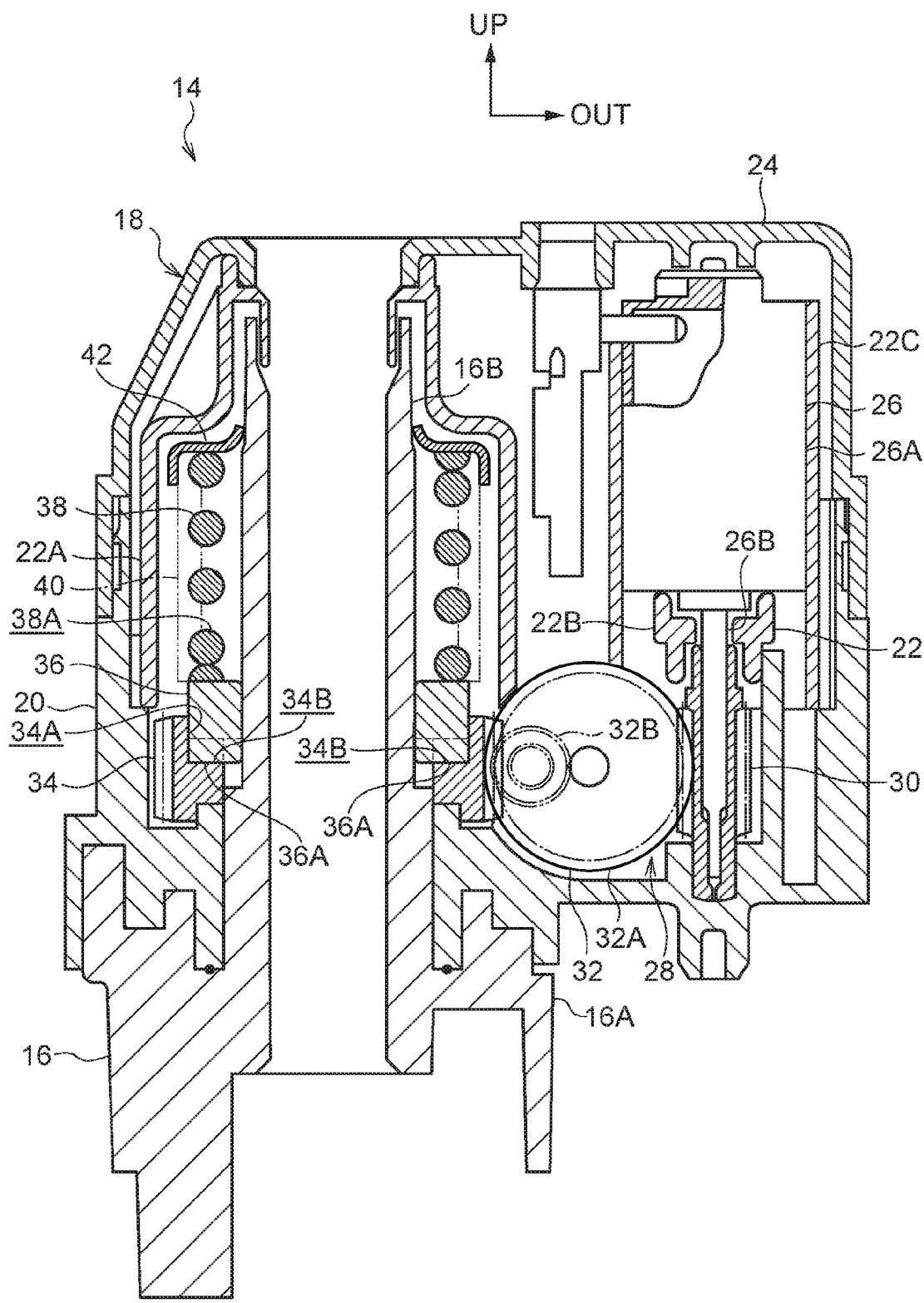
FIG. 3 is a cross-section illustrating the stowing mechanism in the vehicular door mirror device according to the exemplary embodiment of the present invention, as viewed from a vehicle rear.
Figure 4:
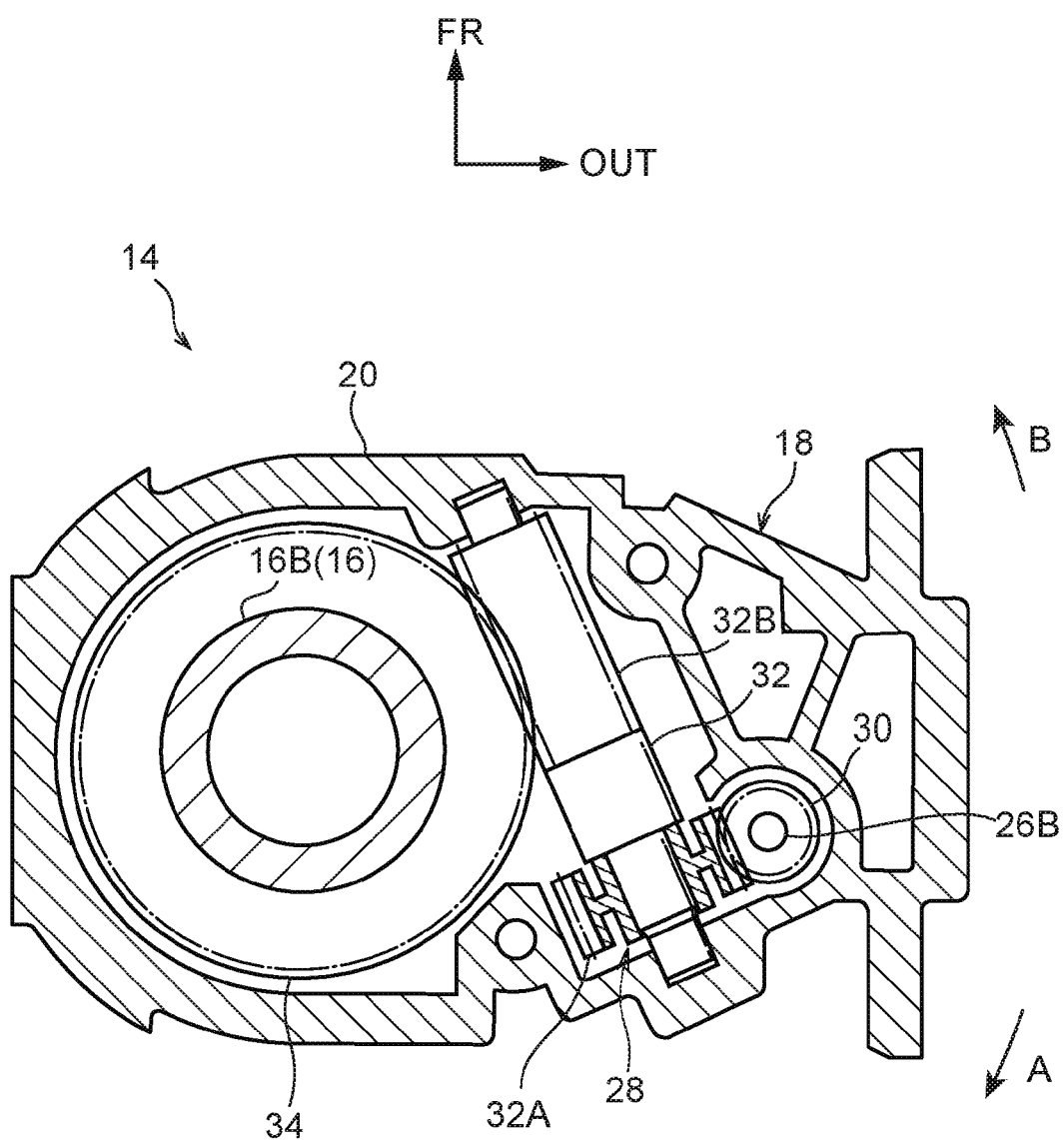
FIG. 4 is a cross-section (taken along line 4-4 in FIG. 2) illustrating the stowing mechanism in the vehicular door mirror device according to the exemplary embodiment of the present invention, as viewed from above.

As illustrated in FIG. 2 to FIG. 4, a stand 16 serving as a support body is provided at the stowing mechanism 14. A substantially circular plate shaped fixing portion 16A is provided at a lower end of the stand 16. The stand 16 is fixed to the stay 12 by fixing the fixing portion 16A to the stay 12, and the stowing mechanism 14 is supported by the stay 12. A substantially circular tube shaped support shaft 16B is integrally provided at an upper side of the fixing portion 16A, and the support shaft 16B is disposed with its axial direction in the up-down direction.

A swinging body 18 is supported by the support shaft 16B so as to be configured to swing.

A container-shaped case 20 made of resin, serving as a swinging member, is provided at a lower side portion of the swinging body 18. An upper face of the case 20 is open. The support shaft 16B of the stand 16 penetrates and fits together with a vehicle width direction inside portion of a lower wall of the case 20. The case 20 is supported by the support shaft 16B so as to be configured to swing.

A motor base 22 made of resin, serving as an assembly member, is fixed inside an upper portion of the case 20. A substantially circular tube shaped housing tube 22A is provided at a vehicle width direction inside portion of the motor base 22. The support shaft 16B of the stand 16 is coaxially housed inside the housing tube 22A. A substantially rectangular plate shaped bottom wall 22B is provided at a vehicle width direction outside portion of the motor base 22. The bottom wall 22B is integrally formed to a lower end portion of the housing tube 22A. A substantially elliptical tube shaped assembly tube 22C is integrally provided at an upper face of the bottom wall 22B. The assembly tube 22C projects out from the bottom wall 22B toward the upper side.

A container-shaped cover 24 made of resin, serving as a covering member, is provided at an upper side of the case 20 and the motor base 22. A lower face of the cover 24 is open. A lower end of the cover 24 is fixed to an upper end portion outer perimeter of the case 20. The cover 24 covers the upper side of the case 20 and the motor base 22.

A motor 26 serving as a drive means is provided inside the stowing mechanism 14. The motor 26 is provided with a substantially elliptical column shaped body portion 26A. The body portion 26A is assembled and fixed to the inside of the assembly tube 22C of the motor base 22 from the upper side. An output shaft 26B (motor shaft) made of metal extends out coaxially from the body portion 26A. The output shaft 26B is disposed with its axial direction in the up-down direction. The output shaft 26B penetrates the bottom wall 22B of the motor base 22 and extends out toward the lower side of the motor base 22. Further, the stowing mechanism 14 is operated by driving the motor 26 such that the output shaft 26B rotates.

A gear mechanism 28 is provided inside the case 20.

A worm gear 30 made of resin, serving as a first stage gear, is provided at the gear mechanism 28 at the lower side of the motor 26. The worm gear 30 is disposed with its axial direction in the up-down direction, and a lower portion of the worm gear 30 is supported by a lower wall of the case 20 so that the worm gear 30 is rotatable. The output shaft 26B of the motor 26 is coaxially inserted into the worm gear 30 from the upper side, and the output shaft 26B rotates such that the worm gear 30 rotates as a unit together with the output shaft 26B.

A worm shaft 32 serving as an intermediate gear is provided at the gear mechanism 28 at a vehicle width direction inside of the worm gear 30. The worm shaft 32 is disposed with its axial direction in the horizontal direction, and is supported by a lower wall of the case 20 so as to be rotatable. A helical gear portion 32A made of resin is coaxially provided at the worm shaft 32 at one end side portion (a vehicle rear side portion) of the worm shaft 32, and a worm gear portion 32B made of metal, serving as a worm, is coaxially provided at the worm shaft 32 at another end side portion (a vehicle front side portion) of the worm shaft 32. The helical gear portion 32A meshes together with the worm gear 30, and rotating the worm gear 30 rotates the helical gear portion 32A and the worm gear portion 32B together as a unit, rotating the worm shaft 32.

A gear plate 34 (worm wheel) made of metal, serving as a swinging portion (final gear), is provided at the gear mechanism 28 at the vehicle width direction inside of the worm shaft 32. The support shaft 16B of the stand 16 coaxially penetrates the gear plate 34. The gear plate 34 is supported by the support shaft 16B so as to be rotatable (swingable), and is supported from the lower side by a lower wall of the case 20.

Figure 5:
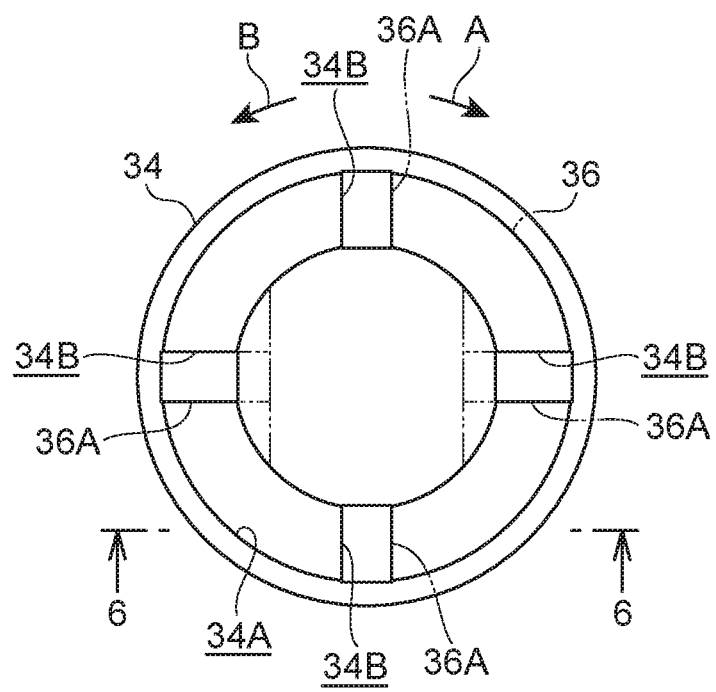
FIG. 5 is a plan view illustrating a gear plate and a clutch plate of the stowing mechanism in the vehicular door mirror device according to the exemplary embodiment of the present invention.

As illustrated in detail in FIG. 5, a recessed portion 34A having a circular shape in plan view is coaxially formed in an upper face of the gear plate 34. The recessed portion 34A is open toward the upper side. Plural (four, in the present exemplary embodiment) detent indents 34B (see FIG. 6A) serving as engaged locations are formed in a lower face of the recessed portion 34A. The plural detent indents 34B are disposed at uniform intervals along the circumferential direction of the gear plate 34. The detent indents 34B have inverted trapezoidal shapes in cross-section. Both side faces of the detent indents 34B are respectively inclined along directions toward the upper side on progression toward the gear plate 34 circumferential direction outsides of the detent indents 34B.

A substantially circular tube shaped clutch plate 36 made of metal, serving as an engagement portion, is provided at the upper side of the gear plate 34. The support shaft 16B of the stand 16 coaxially penetrates the clutch plate 36. The clutch plate 36 is non-rotatably supported by the support shaft 16B, is movable along the up-down direction with respect to the support shaft 16B, and is fitted into the recessed portion 34A of the gear plate 34.

Plural (four, in the present exemplary embodiment) detent protrusions 36A (see FIG. 6A) serving as engaging locations are formed in a lower face of the clutch plate 36. The plural detent protrusions 36A are disposed at uniform intervals along the circumferential direction of the clutch plate 36. The detent protrusions 36A have inverted trapezoidal shapes in cross-section. Both side faces of the detent protrusions 36A are respectively inclined along directions toward the lower side on progression toward the clutch plate 36 circumferential direction inside of the detent protrusions 36A. The cross-sectional shape of the detent protrusions 36A is configured slightly smaller than, and in a similar shape to, the cross-sectional shape of the detent indents 34B of the gear plate 34. A lower face of the clutch plate 36 makes contact (face contact) with a lower face of the recessed portion 34A of the gear plate 34 by the detent protrusions 36A being inserted into the detent indents 34B.

A helix shaped coil spring 38 made of metal, serving as a biasing means, is provided at the upper side of the clutch plate 36. The support shaft 16B of the stand 16 is coaxially inserted into the coil spring 38. A gap 38A is formed in a helix shape at an outer circumferential portion of the coil spring 38. The gap 38A is present at a predetermined number of locations along the axial direction (biasing direction) of the coil spring 38.

Figure 7:
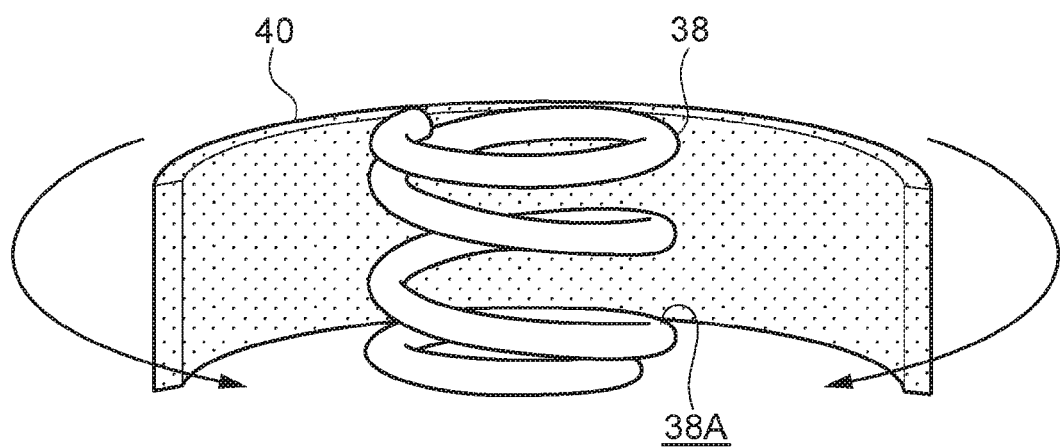
FIG. 7 is an exploded perspective view illustrating a coil spring and butyl tape of the stowing mechanism in the vehicular door mirror device according to the exemplary embodiment of the present invention.

As illustrated in detail in FIG. 7, a strip of butyl tape 40 serving as a damping member is attached (adhered) to the outer circumference of the coil spring 38. The strip of butyl tape 40 is made of soft butyl that is elastic and sticky, and the butyl tape 40 has vibration damping ability. The butyl tape 40 is wrapped around the coil spring 38 along the circumferential direction of the coil spring 38 (a direction perpendicular (a direction intersecting) to the axial direction). The butyl tape 40 spans between a portion of the coil spring 38 on the upper side of the gap 38A and a portion of the coil spring 38 on the lower side of the gap 38A, and is disposed at the entirety of the gap 38A. The butyl tape 40 enters into the gap 38A, and the butyl tape 40 is sandwiched between the portion of the coil spring 38 on the upper side of the gap 38A and the portion of the coil spring 38 on the lower side of the gap 38A (see FIG. 3).

A substantially circular ring plate shaped push nut 42 serving as a stopping member is provided at the upper side of the coil spring 38. The push nut 42 is coaxially fixed to the support shaft 16B of the stand 16. The push nut 42 presses the coil spring 38 toward the lower side to compress the coil spring 38, and the coil spring 38 biases the clutch plate 36 toward the lower side. Accordingly, biasing force from the coil spring 38 causes the clutch plate 36 to engage with the gear plate 34, maintains a state in which the detent protrusions 36A of the clutch plate 36 are inserted into the detent indents 34B of the gear plate 34, and rotation of the gear plate 34 is restricted by the clutch plate 36.

The gear plate 34 is meshed together with the worm gear portion 32B of the worm shaft 32, and thereby swinging of the worm gear portion 32B about the gear plate 34 is stopped, and swinging of the swinging body 18 with respect to the gear plate 34 is stopped. As described above, when the worm gear portion 32B is rotated, the worm gear portion 32B swings about the gear plate 34 such that the swinging body 18 swings as a unit together with the worm gear portion 32B with respect to the gear plate 34.

As illustrated in FIG. 1, the swinging body 18 is housed within a vehicle width direction inside portion of a substantially cuboid container-shaped visor 44 serving as a housing member. A vehicle rear side face of the visor 44 is open. A substantially rectangular plate shaped mirror 46, serving as a visual recognition means, is disposed inside the visor 44 in the vicinity of the vehicle rear side face (an open portion). The visor 44 covers the entire periphery and the vehicle front side face of the mirror 46.

The visor 44 and the mirror 46 are coupled to and supported by the swinging body 18. The visor 44 and the mirror 46, together with the swinging body 18, project out with respect to the side door so as to stand out (open out). A mirror face 46A of the mirror 46 is pointed behind the vehicle. Accordingly, the mirror 46 enables a vehicle occupant (in particular the driver) to see behind the vehicle, and assists visual recognition by the vehicle occupant. Further, the visor 44 and the mirror 46 are configured to swing together with the swinging body 18 as a unit about the support shaft 16B of the stand 16.

Explanation follows regarding operation of the present exemplary embodiment.

In the stowing mechanism 14 of the vehicular door mirror device 10 configured as above, biasing force from the coil spring 38 causes the clutch plate 36 to engage with the gear plate 34 (maintaining a state in which the detent protrusions 36A of the clutch plate 36 are inserted into the detent indents 34B of the gear plate 34), such that rotation of the gear plate 34 with respect to the clutch plate 36 in a rearward direction (the direction of arrow A in FIG. 4, etc.) and a forward direction (the direction of arrow B in FIG. 4, etc.) is restricted, and rotation of the swinging body 18, the visor 44, and the mirror 46 in the rearward direction (rear stowing direction) and the forward direction (front stowing direction) is restricted.

When the stowing mechanism 14 is operated, the motor 26 is driven to rotate the output shaft 26B. Accordingly, in the gear mechanism 28, the worm gear 30 rotates as a unit together with the output shaft 26B, rotating the worm shaft 32 (the helical gear portion 32A and the worm gear portion 32B) to swing the worm gear portion 32B about the gear plate 34, swinging the swinging body 18, the visor 44, and the mirror 46 together as a unit with the worm gear portion 32B with respect to the gear plate 34.

When the motor 26 is driven such that the output shaft 26B rotates in one direction, the worm gear portion 32B swings in the rearward direction about the gear plate 34, and the swinging body 18, the visor 44, and the mirror 46 swing in the rearward direction (toward the vehicle rear side and the vehicle width direction inside). Accordingly, projection of the swinging body 18, the visor 44, and the mirror 46 out from the side door is eliminated, and the swinging body 18, the visor 44, and the mirror 46 are stowed (stowed to the rear).

Then, when the motor 26 is driven such that the output shaft 26B rotates in another direction, the worm gear portion 32B swings in the forward direction about the gear plate 34, and the swinging body 18, the visor 44, and the mirror 46 swing in the forward direction (toward the vehicle front side and the vehicle width direction outside). The swinging body 18, the visor 44, and the mirror 46 are thus projected so as to stand out from the side door (be returned).

Further, when external force from a large load in one of the rearward direction or the forward direction acts on at least one of the visor 44 or the mirror 46, rotational force from the large load in the one of the rearward direction or the forward direction is input to the gear plate 34 from the worm gear portion 32B of the swinging body 18. Accordingly, the clutch plate 36 moves against the biasing force from the coil spring 38 towards the upper side, the clutch plate 36 is disengaged from the gear plate 34 (insertion of the detent protrusions 36A into the detent indents 34B is eliminated), and rotation of the gear plate 34 in the one of the rearward direction or the forward direction with respect to the clutch plate 36 is permitted by the lower face of the recessed portion 34A of the gear plate 34 being disposed at the lower face of the detent protrusions 36A (see FIG. 6B), permitting the swinging body 18, the visor 44, and the mirror 46 to be swung in the one of the rearward direction or the forward direction.

Then, when external force in the rearward direction or the forward direction acts on at least one of the visor 44 or the mirror 46, or when the motor 26 is driven such that the worm gear portion 32B rotates, rotational force in the rearward direction or the forward direction is input to the gear plate 34 from the worm gear portion 32B. Accordingly, the gear plate 34 rotates in the rearward direction or the forward direction with respect to the clutch plate 36, and rotation of the gear plate 34 in the rearward direction and the forward direction with respect to the clutch plate 36 is restricted by the biasing force from the coil spring 38 causing the clutch plate 36 to move toward the lower side and engage the gear plate 34 (to insert the detent protrusions 36A into the detent indents 34B) (see FIG. 6A), restricting the swinging body 18, the visor 44, and the mirror 46 from rotating in the rearward direction and the forward direction.

However, as described above, when the gear plate 34 is rotated in the rearward direction or the forward direction with respect to the clutch plate 36 such that the biasing force from the coil spring 38 causes the clutch plate 36 to move toward the lower side and engage the gear plate 34 (to insert the detent protrusions 36A into the recessed portion 34B), an impact sound is produced from the metal clutch plate 36 (in particular, the lower face thereof) being caused to impact the metal gear plate 34 (in particular, the lower face of the recessed portion 34A) by biasing force from the coil spring 38, and this impact sound is transmitted to the metal coil spring 38 and a reverberation sound is produced.

The butyl tape 40 is attached to the outer circumference of the coil spring 38. The butyl tape 40 spans between the portion of the coil spring 38 on the upper side of the gap 38A and the portion of the coil spring 38 on the lower side of the gap 38A, and suppresses (absorbs) vibration of the coil spring 38. This enables the impact sound and the reverberation sound to be damped.

Additionally, the butyl tape 40 enters into the gap 38A of the coil spring 38 and is sandwiched between the portion of the coil spring 38 on the upper side of the gap 38A and the portion of the coil spring 38 on the lower side of the gap 38A. This enables the butyl tape 40 to effectively suppress (absorb) vibration of the coil spring 38, and enables effective damping of the impact sound and the reverberation sound.

Moreover, not only is the butyl tape 40 disposed on the gap 38A along the entire axial direction of the coil spring 38, the butyl tape 40 is also disposed over the entirety of the gap 38A of the coil spring 38. This enables the butyl tape 40 to even more effectively suppress (absorb) vibration of the coil spring 38, and enables even more effective damping of the impact sound and the reverberation sound.

Further, the gap 38A is formed in a helix shape at an outer circumferential portion of the coil spring 38, and the butyl tape 40 is wrapped around the coil spring 38 along the circumferential direction of the coil spring 38. This enables the butyl tape 40 to easily span between the portion of the coil spring 38 on the upper side of the gap 38A and the portion of the coil spring 38 on the lower side of the gap 38A.

Test Example

In the present Test Example, impact sound and reverberation sound (referred to as "produced sound" below) were measured for the stay 12 and a stowing mechanism 14 not provided with the butyl tape 40 (referred to as a "non-countermeasured component" below), and for the stay 12 and the stowing mechanism 14 (referred to as a "countermeasured component" below).

The measurement location was a soundproof room having 31.8 dB of background noise. The measurement apparatus employed a LA-5560 sound level meter manufactured by Ono Sokki, and employed Ono Sokki's DS0221 for FFT (Fast Fourier Transform) analysis. In the LA-5560, frequency characteristics were A-weighted, the dynamic response was set to FAST, and the measurement range was set to from 60 dB to 120 dB for the non-countermeasured component and to from 40 dB to 100 dB for the countermeasured component. In the DS0221, the frequency range was set to 20 kHz, the sampling number was set to 4096, the number of averages was set to 50, and the Gap amount was set to 1.

In the present Test Example, the clutch plate 36 was caused to move toward the lower side and engage with the gear plate 34 (insertion of the detent protrusions 36A into the detent indents 34B) under biasing force from the coil spring 38, by manually swinging a swinging body 18, which had been swung in the rearward direction from a standing-out state such that engagement of the clutch plate 36 with the gear plate 34 (insertion of the detent protrusions 36A into the detent indents 34B) was released, in the forward direction so as to return to the standing-out state, and the produced sound was produced. Additionally, the produced sound was measured with the sound level meter set at a position separated 300 mm from a peripheral face of the stowing mechanism 14 in the horizontal direction.

As illustrated in FIG. 8, in the present Test Example, produced sound was produced and measured at three occasions r1, r2, and r3, for the non-countermeasured component and for the countermeasured component. Note that in FIG. 8, "AVE." is an average value, and σ is a standard deviation.

Figure 9:
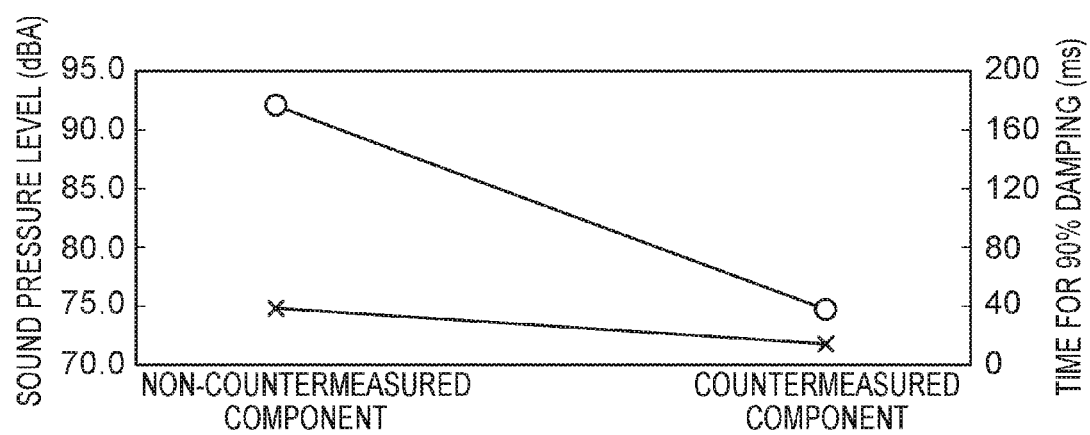
FIG. 9 is a graph illustrating measurement results of the Test Example.

As illustrated in FIG. 8 and FIG. 9, the produced sound is higher in pitch, greater in volume, and longer in the non-countermeasured component. However, in the countermeasured component, the sound pressure level of produced sound was reduced by approximately 18 dB from that of the non-countermeasured component, and the time for 90% damping of the produced sound was reduced by about ⅓ from that of the non-countermeasured component.

Figure 10:
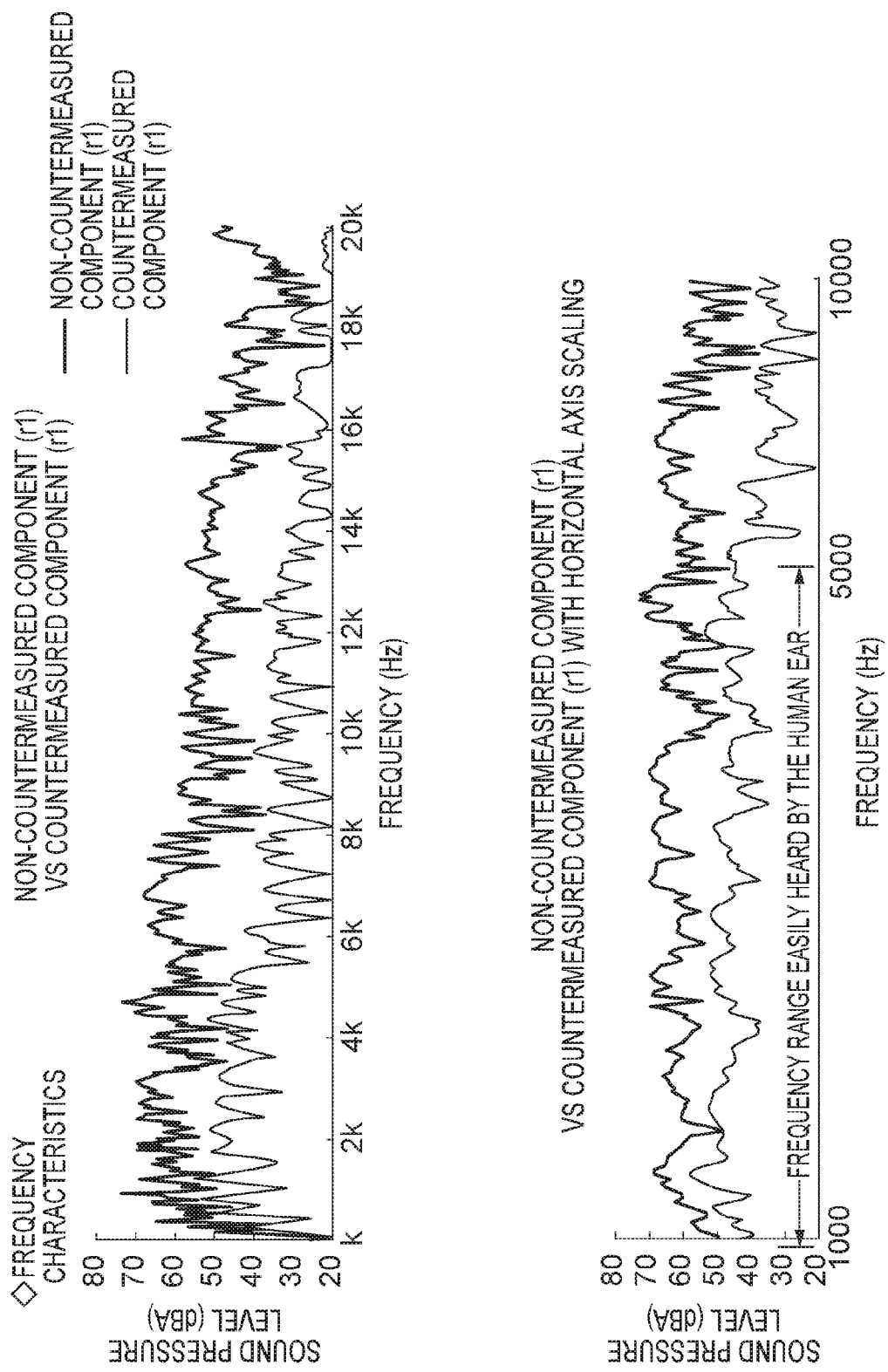
FIG. 10 is a graph illustrating measurement results with regards to frequency characteristics of produced sound in the Test Example.

As illustrated in FIG. 10, with regards to the frequency characteristics of produced sound, the sound pressure level of produced sound from the countermeasured component was overall lower than that of the non-countermeasured component. The shape of frequency characteristics of produced sound from the countermeasured component was also similar to that of the non-countermeasured component, and was a shape offset toward a lower sound pressure level.

As illustrated in FIG. 11, with regards to the time domain waveform of the produced sound, the sound pressure of produced sound from the countermeasured component was lower than that of the non-countermeasured component, and the damping time of produced sound was shorter than that of the non-countermeasured component.

In the stowing mechanism 14, biasing force from the coil spring 38 causes the clutch plate 36 to move toward the lower side and engage the gear plate 34 such that the produced sound is produced, and so it is thought that vibration of the coil spring 38 readily influences the produced sound. Accordingly, it is thought that the butyl tape 40 suppresses (absorbs) vibration of the coil spring 38, enabling the sound pressure of produced sound to be lowered, and enabling the damping time of produced sound to be shortened.

Note that in the above exemplary embodiment, the butyl tape 40 is caused to enter into the gap 38A of the coil spring 38. However, configuration may be made such that the butyl tape 40 is not caused to enter into the gap 38A of the coil spring 38.

Additionally, in the above exemplary embodiment, the butyl tape 40 is disposed over the entirety of the gap 38A of the coil spring 38. However, it is sufficient that configuration be made such that the butyl tape 40 is disposed on the gap 38A along the entire axial direction of the coil spring 38. In such case, it is preferable that the coil spring 38 circumferential direction dimension of the butyl tape 40 is, for example, 5 mm or greater.

Further, in the above exemplary embodiment, the damping member is the butyl tape 40. However, the damping member may be any macromolecular substance, and besides a rubber (natural rubber or synthetic rubber), may also be a resin (such as a vinyl acetate-based resin, an acrylic ester-based resin, a polyester-based resin, or a polyisobutylene-based resin). Moreover, the damping member may be a gelatinous material (such as an organogel, a gel-rubber, a polymer-based gel, a silicon-based gel, or a fluoride ion-exchange resin) resulting from the product of macromolecule synthesis solidifying, or may be a clay.

Additionally, in the above exemplary embodiment, the damping member is the butyl tape 40, and the butyl tape 40 is attached to the outer circumference of the coil spring 38. However, the damping member may be a damping coating (a urethane-based, acrylic-based, or silicon-based resin coating), and the damping coating may be applied to the coil spring 38. In such case, the damping coating may be applied to faces of the coil spring 38 on the gap 38A side, and the damping coating may be disposed between the portion of the coil spring 38 on the upper side of the gap 38A and the portion of the coil spring 38 on the lower side of the gap 38A.

Further, in the above exemplary embodiment, the motor 26 and the gear mechanism 28 are provided at the stowing mechanism 14. However, configuration may be made such that the motor 26 and the gear mechanism 28 are not provided at the stowing mechanism 14. In such case, for example, the engagement portion of the present invention is the case 20, and the detent indents 34B are provided at a lower wall of the case 20 such that the clutch plate 36 (detent protrusions 36A) engages with the case 20 (detent indents 34B).

Additionally, in the above exemplary embodiment, the vehicular visual recognition device of the present invention is the vehicular door mirror device 10. However, the vehicular visual recognition device of the present invention may be another vehicular mirror device (another vehicular outer mirror device outside the vehicle (for example, a vehicular fender mirror device) or a vehicular inner mirror device inside the vehicle), a vehicular camera device (that images to assist visual recognition by the vehicle occupant), or the like.

The entire content of the disclosure of Japanese Patent Application No. 2014-210114 filed Oct. 14, 2014 is incorporated by reference in the present specification.

EXPLANATION OF THE REFERENCE NUMERALS

10 vehicular door mirror device (vehicular visual recognition device)
16 stand (support body)
34 gear plate (swinging portion)
36 clutch plate (engagement portion)
38 coil spring (biasing means)
46 mirror (visual recognition means)

The invention claimed is:

1. A vehicular visual recognition device, comprising:
   a support body that is provided on a vehicle body side;
   a visual recognition means that is supported by the support body so as to be configured to swing, and that assists visual recognition by a vehicle occupant;
   an engagement portion that is provided on a support body side;
   a swinging portion that is provided on a visual recognition means side;

a biasing means that is provided with a gap, that uses biasing force to cause the engagement portion to engage with the swinging portion to restrict swinging of the visual recognition means, and that permits the visual recognition means to be swung and stowed by disengaging the engagement portion from the swinging portion against the biasing force; and a damping member that is attached to the biasing means, and that is provided between a portion of the biasing means on one side of the gap and a portion of the biasing means on another side of the gap, and that dampens sound produced when the biasing means uses the biasing force to cause the swinging portion to engage with the engagement portion.

2. The vehicular visual recognition device of claim 1, wherein the damping member is provided at the biasing means along a direction intersecting the biasing direction of the biasing means.

3. A vehicular visual recognition device, comprising
a support body that is provided on a vehicle body side;
a visual recognition means that is supported by the support body so as to be configured to swing, and that assists visual recognition by a vehicle occupant;
an engagement portion that is provided on a support body side;
a swinging portion that is provided on a visual recognition means side;
a biasing means that is provided with a gap, that uses biasing force to cause the engagement portion to engage with the swinging portion to restrict swinging of the visual recognition means, and that permits the visual recognition means to be swung and stowed by disengaging the engagement portion from the swinging portion against the biasing force; and
a damping member that is provided between a portion of the biasing means on one side of the gap and a portion of the biasing means on another side of the gap, that enters into the gap and that dampens sound produced when the biasing means uses the biasing force to cause the swinging portion to engage with the engagement portion.

4. The vehicular visual recognition device of claim 3, wherein the damping member is provided at the biasing means along a direction intersecting the biasing direction of the biasing means.

5. A vehicular visual recognition device, comprising
a support body that is provided on a vehicle body side;
a visual recognition means that is supported by the support body so as to be configured to swing, and that assists visual recognition by a vehicle occupant;
an engagement portion that is provided on a support body side;
a swinging portion that is provided on a visual recognition means side;
a biasing means that is provided with a gap, that uses biasing force to cause the engagement portion to engage with the swinging portion to restrict swinging of the visual recognition means, and that permits the visual recognition means to be swung and stowed by disengaging the engagement portion from the swinging portion against the biasing force; and
a damping member that is provided between a portion of the biasing means on one side of the gap and a portion of the biasing means on another side of the gap, that is provided at the gap along an entirety of a biasing direction of the biasing means and that dampens sound produced when the biasing means uses the biasing force to cause the swinging portion to engage with the engagement portion.

6. The vehicular visual recognition device of claim 5, wherein the damping member is provided at an entirety of the gap.

7. The vehicular visual recognition device of claim 5, wherein the damping member is provided at the biasing means along a direction intersecting the biasing direction of the biasing means.

* * * * *